US012701038B2

(12) United States Patent
Bao et al.

(10) Patent No.: US 12,701,038 B2
(45) Date of Patent: Aug. 4, 2026

(54) DATA MODULATION METHOD AND APPARATUS, AND MEDIUM AND STORAGE MEDIUM

(71) Applicant: ZTE CORPORATION, Shenzhen (CN)

(72) Inventors: Tong Bao, Shenzhen (CN); Yu Xin, Shenzhen (CN); Jian Hua, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 3 days.

(21) Appl. No.: 18/872,827

(22) PCT Filed: Aug. 18, 2023

(86) PCT No.: PCT/CN2023/113791
§ 371 (c)(1),
(2) Date: Dec. 8, 2024

(87) PCT Pub. No.: WO2024/113975
PCT Pub. Date: Jun. 6, 2024

(65) Prior Publication Data
US 2025/0365185 A1     Nov. 27, 2025

(30) Foreign Application Priority Data
Nov. 29, 2022     (CN) .......................... 202211509632.1

(51) Int. Cl.
*H04L 27/26* (2006.01)
*H04L 27/36* (2006.01)
(52) U.S. Cl.
CPC ...... *H04L 27/2627* (2013.01); *H04L 27/2614* (2013.01); *H04L 27/36* (2013.01)

(58) Field of Classification Search
CPC .. H04L 27/2627; H04L 27/2614; H04L 27/36
(Continued)

(56) References Cited

U.S. PATENT DOCUMENTS

| | | | |
|---|---|---|---|
| 11,855,824 B2 | 12/2023 | Xin et al. | |
| 2010/0069009 A1* | 3/2010 | Bloebaum | H04L 25/03834 455/63.1 |

(Continued)

FOREIGN PATENT DOCUMENTS

| | | | |
|---|---|---|---|
| CN | 111901276 | * | 11/2020 |
| CN | 111901277 A | | 11/2020 |
| WO | 2021027901 A1 | | 2/2021 |

OTHER PUBLICATIONS (ISA/237) Written Opinion of the International Searching Authority issued on Nov. 14, 2023.
(Continued)

*Primary Examiner* — Leila Malek
(74) *Attorney, Agent, or Firm* — NZ Carr Law Office

(57) ABSTRACT

Provided in the embodiments of the present application are a data modulation method, a data modulation apparatus, a computer-readable storage medium and a computer program product. The method comprises: modulating a data sequence by using N constellation point modulation symbols {S(n)}, so as to obtain K modulated data symbols [x(k)], wherein the N constellation point modulation symbols comprise two groups of modulation symbols, the phase difference between the two groups of modulation symbols being a preset angle, and N is an even number greater than or equal to 4, n is any integer from 0 to N−1, K represents the number of modulated data symbols, K is an integer, and k is any integer from 0 to K−1; performing a filtering operation on the modulated data symbols, so as to obtain filtered data; and transmitting the filtered data on a physical resource.

18 Claims, 6 Drawing Sheets

S110 — Modulate a data sequence by using N constellation point modulation symbols {S(n)}, to obtain K modulated data symbols [x(k)]

S120 — Perform a filtering operation on the modulated data symbols, to obtain filtered data S130 — Transmit the filtered data on a physical resource

(58) Field of Classification Search
USPC ......................................................... 375/295
See application file for complete search history.

(56) References Cited

U.S. PATENT DOCUMENTS

| | | | |
|---|---|---|---|
| 2019/0215223 A1 | 7/2019 | Chen et al. | |
| 2019/0327120 A1 | 10/2019 | Yun et al. | |
| 2023/0216723 A1 | 7/2023 | Xin et al. | |

OTHER PUBLICATIONS

The international search report of the corresponding PCT Application No. PCT/CN2023/113791 mailed on Nov. 14, 2023.
EESR of the corresponding EP Patent Application No. 23896135.3 dated Oct. 17, 2025.
Peruga Nasarre Ismael et al: "Constrained PSK: Energy-Efficient Modulation for Sub-THz Systems", 2020 IEEE International Conference on Communications Workshops (ICC Workshops) , IEEE, Jun. 7, 2020 (Jun. 7, 2020) , pp. 1-7 , XP033796102 , DOI: 10.1109/ICCWORKSHOPS49005.2020.9145132 [retrieved on Jul. 20, 2020].

* cited by examiner

| S110 | Modulate a data sequence by using N constellation point modulation symbols {S(n)}, to obtain K modulated data symbols [x(k)] |
|---|---|
| S120 | Perform a filtering operation on the modulated data symbols, to obtain filtered data |
| S130 | Transmit the filtered data on a physical resource |

DATA MODULATION METHOD AND APPARATUS, AND MEDIUM AND STORAGE MEDIUM

CROSS REFERENCE TO RELATED APPLICATION

The present application is corresponding to International Patent Application No. PCT/CN2023/113791, field on Aug. 18, 2023, which is based on and claims the priority from Chinese Patent Application No. 202211509632.1, filed on Nov. 29, 2022, the entirety of which is incorporated herein by reference.

TECHNICAL FIELD

The embodiments of the present application relate to the technical field of communication, in particular to a data modulation method, a data modulation apparatus, a computer-readable storage medium and a computer program product.

BACKGROUND

A high-frequency scenario is one of important scenarios for 5G-and-Beyond (B5G) and the 6th Generation (6G) Mobile Networks standard in future. The high-frequency scenario has the characteristic of high phase noise, large Doppler shift, large path loss and large shadow attenuation.

In some cases, although a phase-tracking reference signal (PTRS) is provided, it is still difficult to meet the need to accurately estimate large phase noise in the high-frequency scenario. Therefore, how to suppress the impact of phase noise is an issue that needs to be discussed and solved urgently during data modulation.

SUMMARY

The embodiments of the present application provide a data modulation method, a data modulation apparatus, a non-transitory computer-readable storage medium and a computer program product, which is intended to reduce the peak average power ratio, suppress phase noise, and reduce the impact of peak average power ratio and phase noise.

In a first aspect, an embodiment of the present application provides a data modulation method, including: modulating a data sequence by using N constellation point modulation symbols $\{S(n)\}$, so as to obtain K modulated data symbols $[x(k)]$, wherein the N constellation point modulation symbols include two groups of modulation symbols, the phase difference between the two groups of modulation symbols is a preset angle, and N is an even number greater than or equal to 4, n is any integer from 0 to N−1, K represents the number of modulated data symbols, K is an integer, and k is any integer from 0 to K−1; performing a filtering operation on the modulated data symbols, so as to obtain filtered data; and transmitting the filtered data on a physical resource.

In a second aspect, an embodiment of the present application provides a data modulation apparatus, including at least one processor, and at least one memory for storing at least one program, wherein the at least one program, when executed by the at least one processor, implements the data modulation method of the first aspect.

In a third aspect, an embodiment of the present application provides a non-transitory computer-readable storage medium, storing a processor-executable computer program thereon, wherein the processor-executable computer program, when executed by a processor, implements the data modulation method of the first aspect.

In a fourth aspect, an embodiment of the present application provides a computer program product, the computer program or the computer instruction is stored in a computer-readable storage medium, a processor of a computer device reads the computer program or the computer instruction from the computer-readable storage medium, and the processor executes the computer program or the computer instruction, so that the computer device performs the data modulation method of the first aspect.

DETAILED DESCRIPTION

Figure 1:
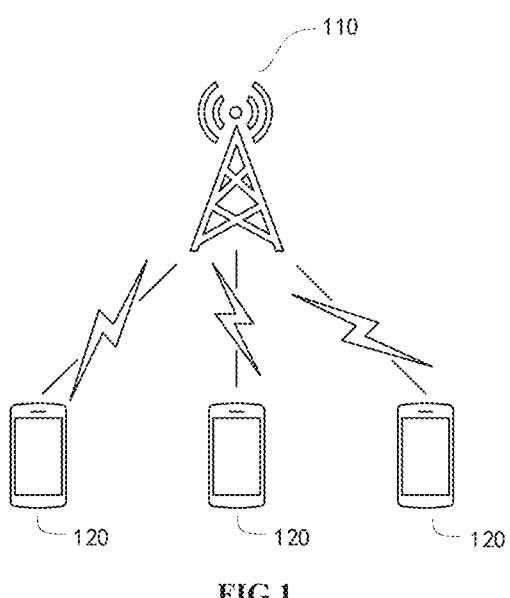
FIG. 1 is a schematic diagram of a communication system provided by an embodiment of the present application.

In order to clarify the objects, technical solutions and advantages of the present application, the present application will be further explained in detail below in conjunction with the accompanying drawings and embodiments. It should be understood that the specific embodiments described here are merely used to illustrate the present application and not intended to be limiting.

It should be noted that although an apparatus is divided into functional modules in the schematic diagram of and a logical order is shown in the flow chart, in some cases, the steps shown or described can be performed by divided modules different from those in the schematic diagram or in an order different from that in the flow chart. The terms "first", "second" and the like in the specification, claims and said drawings are used to distinguish similar objects rather than necessarily describing a specific order or sequence.

In the description of the embodiments of the present application, unless otherwise clearly defined, words such as "dispose", "install", "connect" and the like should be understood in a broad sense, and those skilled in the art can reasonably determine specific meanings of the above words in the embodiments of the present application based on specific content of the technical solution.

In the embodiments of the present application, words such as "further", "exemplarily" or "optionally" and the like are used to indicate examples, illustrations or descriptions, and should not be construed as being more preferred or more advantageous than other embodiments or designs. The words "further", "exemplarily" or "optionally" and the like are used to present related concepts in a specific way.

In some cases, the phase noise is relatively high in a high-frequency scenario, even if phase compensation is performed at the receiving end, a lot of phase noise still remains. The Doppler shift is relatively large in a high-frequency scenario, even if frequency offset compensation is performed at the receiving end, some phase deviation remains in data symbols. In the high-frequency scenario, there are also problems of large path loss and shadow attenuation, therefore, the signal-to-noise ratio tends to be very low in some areas at the edge of a cell, and the efficiency of a Power Amplifier (PA) is relatively low at high frequency. In order to increase the signal-to-noise ratio while taking the power consumption of the user-side battery into account, it is necessary to have a low peak average power ratio (PAPR) of the signal transmitted at the user side.

In addition, in the scenario of Massive Machine Type Communication (mMTC), due to actual needs, some terminal devices need to significantly reduce battery power consumption while increasing the PA efficiency of a terminal, at this time, it is also necessary to achieve a low peak average power ratio of the signal transmitted by the terminal.

In some cases, although a PTRS is provided, the requirement for accurately estimating high phase noise in the high-frequency scenario cannot be met. Although the peak average power ratio of a Discrete Fourier Transform-Spread OFDM (DFT-s-OFDM) signal is relatively low in DFT-s-OFDM, for a modulation method with a modulation order greater than 2, the peak average power ratio of the modulated signals is still high.

In order to solve the above-mentioned problem, the embodiments of the present application provide a data modulation method, a data modulation apparatus, a non-transitory computer-readable storage medium and a computer program product. By modulating a data symbol sequence from a constellation point modulation symbol sequence consisting of two groups of modulation symbols with a phase difference of a preset angle, the impact of phase noise can be suppressed more effectively. By performing a filtering operation on modulated data symbols so as to obtain filtered data, the peak average power ratio of the data signals can be further reduced. The modulus values of modulation symbols in each group are different from one another, so that different modulation symbols can be easily distinguished according to different powers, which increases the number of data contained in a unit when the data sequence is modulated, and increases the data transmission rate; by distinguishing different modulation symbols according to different modulus values or different powers, the impact of phase noise can be suppressed more effectively. In each group of modulation symbols, the maximum modulus value is greater than the minimum modulus value difference, which can reduce the modulus value difference among modulation symbols, so that the peak average power ratio of modulated signals is lower. By means of modulating a data sequence by alternately using a constellation point modulation symbol $\{S(n)\}$ and a constellation point modulation symbol $\{e^{j\theta}S(n)\}$ after phase change $\theta$, the phase difference between adjacent modulation symbols is less than $\pi$, and the peak average power ratio of the modulated data signal is reduced.

FIG. 1 is a schematic diagram of a communication system provided by an embodiment of the present application. As shown in the figure, in an embodiment, exemplarily, the communication system includes a base station 110 and a plurality of terminals 120, and the base station 110 is in communication connection with each terminal 120.

It can be understood that the number of devices in the communication system and the communication relationship among devices of this embodiment can be expanded and changed according to actual needs, and is not specifically limited here.

The technical schemes of the embodiments of the present application can be applied to various communication systems, such as Wideband Code Division Multiple Access (WCDMA), Evolved Universal Terrestrial Radio Access Network (E UTRAN) system, Next Generation Radio Access Network (NG RAN) system, Long Term Evolution (LTE) system, Worldwide Interoperability For Microwave Access (WiMAX) communication system, 5th Generation (5G) system, New Radio Access Technology (NR), and future communication systems, such as 6G system.

The technical schemes of the embodiments of the present application can be applied to various communication technologies, such as microwave communication, optical wave communication, millimeter wave communication, etc. The specific technology and device form adopted is not limited in the embodiments of the present application.

The base station 110 of the embodiments of the present application may be an evolved NodeB (eNB), a transmission reception point (TRP), a next generation NodeB (gNB) in an NR system, a base station in other future mobile communication system, or an access node in a wireless fidelity (WiFi) system, etc. The specific technology and device form adopted by a network device is not limited in embodiments of the present application.

The terminal 120 of the embodiments of the present application is an entity for receiving or transmitting signals at the user side, such as a mobile phone. The terminal device may also refer to as a terminal, a user equipment (UE), a mobile station (MS), a mobile terminal (MT), etc. The terminal device may be a vehicle with communication functions, a smart vehicle, a mobile phone, a wearable device, a tablet computer (Pad), a computer with wireless transceiver function, a virtual reality (VR) device, an augmented reality (AR) device, a communication device in industrial control, a communication device in self-driving, a communication device in remote medical surgery, a communication device in smart grid, a communication device in transportation safety, a communication device in smart city, and a communication device in smart home, etc. The specific technology and device form adopted by a device is not limited in embodiments of the present application.

Figure 2:
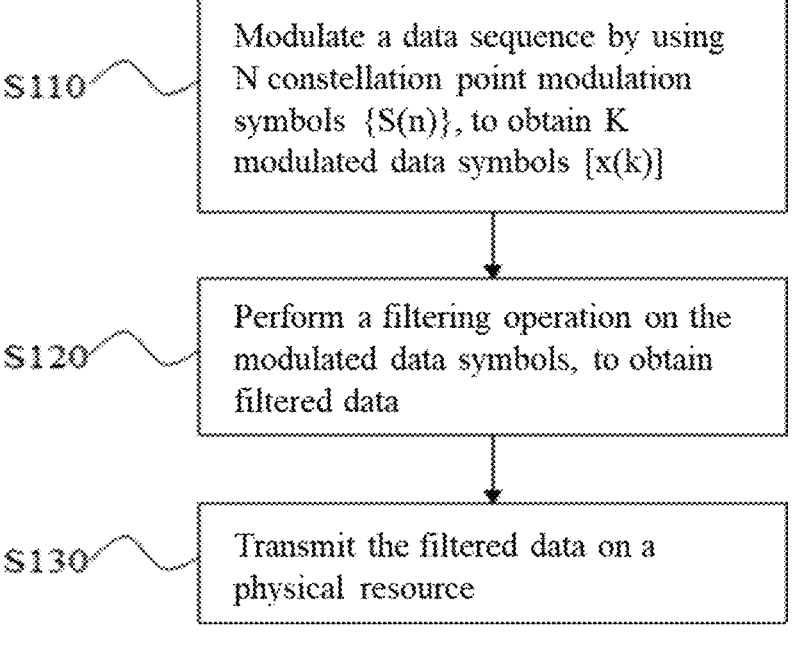
FIG. 2 is a flow chart of a data modulation method provided by an embodiment of the present application.

FIG. 2 is a flow chart of a data modulation method provided by an embodiment of the present application. As shown in FIG. 2, the data modulation method may be applied to, but is not limited to, a base station, a terminal, or a communication system as provided in FIG. 1. In the embodiment of FIG. 2, the data modulation method may include, but is not limited to, steps S110, S120, and S130.

At step S110: a data sequence is modulated by using N constellation point modulation symbols $\{S(n)\}$, to obtain K modulated data symbols $[x(k)]$, wherein the N constellation point modulation symbols include two groups of modulation symbols, the phase difference between the two groups of modulation symbols is a preset angle, and N is an even number greater than or equal to 4, n is any integer from 0 to N−1, K represents the number of the modulated data symbols, and k is any integer from 0 to K−1.

In an embodiment, the data sequence [b(m)] consists of 0 and 1 and includes a plurality of binary bit data, the data sequence [b(m)] is a data sequence that has been encoded.

In an embodiment, the number of modulation symbols comprised in each of the two groups of modulation symbols is N/2. N constellation point modulation symbols {S(n)} are equally divided into two groups, the number of modulation symbols in the first group of modulation symbols is N/2, and the number of modulation symbols in the second group of modulation symbols is also N/2.

In an embodiment, the two groups of modulation symbols include a first group of modulation symbols and a second group of modulation symbols, the modulation symbols in the first group of modulation symbols have the same phase, the modulation symbols in the second group of modulation symbols have the same phase, and the phase difference between the first group of modulation symbols and the second group of modulation symbols is 180 degrees, that is, the phase difference is $\pi$. The phase difference between the first group of modulation symbols and the second group of modulation symbols is $\pi$, since the phase difference is relatively large, the impact of phase noise can be suppressed more effectively.

In an embodiment, the modulus values of modulation symbols in each group are different from one another, and the modulus value of any modulation symbol in the first group of modulation symbols is the same with the modulus value of one modulation symbol in the second group of modulation symbols. The modulus values of individual symbols in the first group of modulation symbols are different from one another, and the modulus values of individual symbols in the second group of modulation symbols are different from one another; the first group of modulation symbols and the second group of modulation symbols are two groups of modulation symbols between which the phase difference is 180 degrees and in which the modulus values are the same respectively.

It can be understood that the phase difference between the first group of modulation symbols and the second group of modulation symbols may also be other values, which is not specifically limited here.

In an embodiment, when the data sequence [b(m)] is modulated by using the N constellation point modulation symbols {S(n)}, the data sequence [b(m)] is mapped and modulated by taking every M binary bit data as a unit, wherein $M=\log_2 N$; since the modulus values in each group of modulation symbols are different from one another, different modulation symbols can be easily distinguished according to different powers, so that the number of constellation point modulation symbols {S(n)} can be increased during modulation, that is the value N is increased. According to $M=\log_2 N$, the value N is increased with increase of the value N, that is, each unit for mapping and modulation can include more binary bit data, which increases the data modulation efficiency, and in turn increases the data transmission rate. Different modulation symbols can be distinguished according to different modulus values or different powers, and the impact of phase noise can also be suppressed more effectively.

In an embodiment, the minimum modulus value of each group of modulation symbols is greater than half of a minimum modulus value difference, wherein the modulus value difference represents a modulus value difference between any two modulation symbols in each group of modulation symbols.

In another embodiment, the minimum modulus value of each group of modulation symbols is greater than the minimum modulus value difference.

In the above embodiments, the peak average power ratio of the modulated signals is reduced by reducing the modulus difference between modulation symbols. When the scheme that the minimum modulus value of modulation symbols is greater than the minimum modulus difference is adopted, the peak average power ratio of the signal can be further reduced.

In an embodiment, the data sequence is modulated by alternately using constellation point modulation symbols {S(n)} and constellation point modulation symbols {$e^{j\theta}S(n)$} after phase change $\theta$, wherein e is a natural constant, j is an imaginary unit, and $\theta$ is equal to $\pi/2$ or $-\pi/2$.

It can be understood that the constellation point modulation symbols {S(n)} and the constellation point modulation symbols {$e^{j\theta}S(n)$} after phase change $\theta$ are different sets of constellation point modulation symbols; $\theta$ may also take any other angle, which is not specifically limited in this application.

In the above embodiment, when $\theta$ is equal to $\pi/2$ or $-\pi/2$, during data modulation, the phase difference between adjacent modulation symbols is $\pi/2$ or $-\pi/2$, which can reduce the peak average power ratio of modulated data signals.

In an embodiment, that the data sequence is modulated by alternately using the constellation point modulation symbols {S(n)} and the constellation point modulation symbols {$e^{j\theta}S(n)$} after phase change $\theta$ includes: the data sequence is modulated by alternately using the constellation point modulation symbols {S(n)} and the constellation point modulation symbols {$e^{j\theta}S(n)$} after phase change $\theta$ by means of taking M binary bit data as a unit, wherein $M=\log_2 N$, M is the logarithm of N with base 2. Data in the data sequence [b(m)] is divided into a plurality of data units by taking M binary bit data as a unit, each data unit in a data sequence [b(m)] is mapped and modulated by alternately using the constellation point modulation symbols {S(n)} and the constellation point modulation symbols {$e^{j\theta}S(n)$} after phase change $\theta$.

In an embodiment, that the data sequence is modulated by alternately using the constellation point modulation symbols {S(n)} and the constellation point modulation symbols {$e^{j\theta}S(n)$} after phase change $\theta$ includes: a data sequence is modulated by using constellation point modulation symbols {$e^{j\theta k}S(n)$} that carry the position numbers of data symbols. K is the number of modulated data symbols, k is the position number of modulated data symbols, $k=0, 1, 2, \ldots, K-1$, $k=0$ represents the first modulated data symbol, $k=1$ represents the second modulated data symbol, and so on. When $\theta$ is equal to $\pi/2$ or $-\pi/2$, and $k=0, 2, 4, \ldots$, that is, k is an even number, $e^{j\theta k}$ is equal to 1 or −1; and when $\theta$ is equal to $\pi/2$ or $-\pi/2$, and $k=1, 3, 5, \ldots$, that is, k is an odd number, and $e^{j\theta k}$ is equal to j or −j.

Exemplarily, when $\theta$ is equal to $\pi/2$ and $k=0, 1, 2, 3, \ldots K-1$. Corresponding to $k=0$, {$e^{j\theta k}S(n)$}={S(n)}; corresponding to $k=1$, {$e^{j\theta k}S(n)$}={jS(n)}; corresponding to $k=2$, {$e^{j\theta k}S(n)$}={−S(n)}; corresponding to $k=3$, {$e^{j\theta k}S(n)$}={−jS(n)}; and corresponding to $k=4$, {$e^{j\theta k}S(n)$}={S(n)}, $\ldots$, and every four consecutive k values form a cycle. The data sequence [b(m)] is modulated by using N constellation point modulation symbols {$e^{j\theta k}S(n)$}, that is, the data sequence [b(m)] is modulated by using {S(n)}, {jS(n)}, {−S(n)}, and {−jS(n)} sequentially and cyclically.

Figure 9:
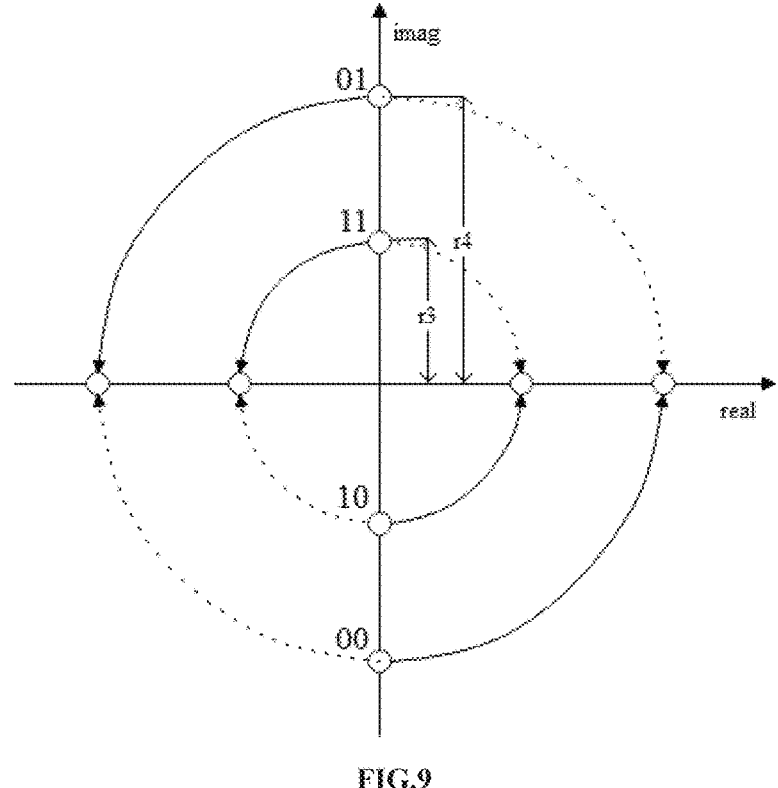
FIG. 9 is a schematic diagram of constellation point mapping of data modulation provided by another example of the present application.

In an embodiment, at least one binary bit data of the M binary bit data is modulated by different phases of constellation point modulation symbols {S(n)}. In mapping modulation, at least one binary bit data is used to distinguish the first group of modulation symbols from the second group of modulation symbols in a group of constellation point modulation symbols {S(n)}, and it can be understood from the above embodiment that the phase of the first group of modulation symbols is different from that of the second group of modulation symbols. Exemplarily, as shown in FIG. 9, the bit information "0, 1" of the constellation point modulation mapping manner in FIG. 9 is viewed from right to left. In FIG. 9, the first bit of the upper half imaginary axis is 1, such as "10", "11", which corresponds to the first group of modulation symbols; the first bit of the lower half imaginary axis is 0, such as "01", "00", which corresponds to the second group of modulation symbols.

At step S120: a filtering operation is performed on the modulated data symbols, to obtain filtered data.

In an embodiment, a filtering parameter of the filtering operation includes E[1,1], wherein E=$\sqrt{2}$/2.

In an embodiment, that the filtering operation is performed on the modulated data symbols includes: a filtering operation is performed on the modulated data symbols by using a time-domain convolution method based on the filtering parameter.

In an embodiment, the time-domain convolution method is circular convolution.

In an embodiment, that the filtering operation is performed on the modulated data symbols by using the time-domain convolution method based on the filtering parameter includes: upon k is less than K−1, x(k) is added to x(k+1) and then a sum thereof is multiplied by a preset parameter, so as to obtain a time-domain data sequence [d(k)]; and upon k is equal to K−1, x(K−1) is added to x(0) and then a sum thereof is multiplied by a preset parameter, so as to obtain a time-domain data sequence [d(K−1)]. It can be understood that the above modulated data symbols all belong to the modulated data symbol sequence of the current group.

In an embodiment, the preset parameter is $$\frac{\sqrt{2}}{2};$$

starting from the first bit x(k), the modulated data symbol x(k) is added to the adjacent modulated data symbol x(k+1) and then the sum thereof is multiplied by $$\frac{\sqrt{2}}{2},$$

so as to obtain the time-domain data sequence [d(k)], that is, to sequentially obtain [d(0)], [d(1)], [d(2)], . . . ; for the last bit x(k), that is, when k=K−1, assuming x(k+1)=x(K)=x(0), that is, x(K−1) is added to x(0) and then the sum thereof is multiplied by $$\frac{\sqrt{2}}{2},$$

so as to obtain the time-domain data sequence [d(K−1)], that is, the last bit x(k) is added to the first bit x(k) and then the sum thereof multiplied by $$\frac{\sqrt{2}}{2},$$

so as to form circular convolution.

In an embodiment, that the filtering operation is performed on the modulated data symbols by using the time-domain convolution method based on the filtering parameter includes: upon k is greater than 0, x(k) is added to x(k−1) and then the sum thereof is multiplied by a preset parameter, so as to obtain a time-domain data sequence [d(k)]; upon k is equal to 0, x(0) is added to x(K−1) and then the sum thereof is multiplied by a preset parameter, so as to obtain a time-domain data sequence [d(0)]. It can be understood that the above modulated data symbols all belong to the modulated data symbol sequence of the current group.

In an embodiment, the preset parameter is $$\frac{\sqrt{2}}{2};$$

starting from the last bit x(k), the modulated data symbol x(k) is added to the adjacent modulated data symbol x(k−1) and then the sum thereof is multiplied by $$\frac{\sqrt{2}}{2},$$

so as to obtain the time-domain data sequence [d(k)], that is, to sequentially obtain [d(0)], [d(1)], [d(2)], . . . ; for the first bit x(k), that is, when k=0, assuming x(k−1)=x(−1)=x(K−1), that is, x(0) is added to x(K−1) and then the sum thereof is multiplied by $$\frac{\sqrt{2}}{2},$$

so as to obtain the time-domain data sequence [d(K−1)], that is, the first bit x(0) is added to the last bit x(K−1) and then the sum thereof is multiplied by $$\frac{\sqrt{2}}{2},$$

so as to form circular convolution.

By adding the adjacent modulated data symbols and then multiplying the sum thereof by E so as to obtain the time-domain data sequence, the peak average power ratio of the modulated data information can be further reduced. It is understood that the value of E may include, but is not limited to being set to $$\frac{\sqrt{2}}{2},$$

which is not specifically limited in this application.

In an embodiment, that the filtering operation is performed on the modulated data symbols includes: the modulated data symbols are transformed into frequency-domain data; the filtering parameter is transformed into a frequency-domain filtering parameter; and the filtering operation is performed on the frequency-domain data by using a frequency-domain dot multiplication method based on the frequency-domain filtering parameter.

In an embodiment, Fourier transformation is performed on the modulated data symbols, so as to obtain the frequency-domain data; the filtering parameter is transformed into the frequency-domain filtering parameter; the filtering operation is performed on the frequency-domain data by using the frequency-domain point multiplication method based on the frequency-domain filtering parameter; and Inverse Fourier transformation is performed on the filtered data symbols.

At step S130: the filtered data is transmitted on a physical resource.

In an embodiment, that the filtered data is transmitted on the physical resource includes: a preset filtering operation is performed on the filtered data. The preset filtering operation includes, but is not limited to, RRC filtering, filtering in a DAC module, etc. In an embodiment, upon the filtered data is time-domain data, the time-domain data sequence is transmitted over an RF link after discrete Fourier transform, inverse discrete Fourier transform, digital to analog conversion and the like thereon.

In an embodiment, the filtered data is transmitted directly on the physical resource. The modulated data symbols are transmitted over an RF link after filtering, digital to analog conversion, and other processing thereon.

In an embodiment, the modulated data symbols are transmitted directly in the time domain.

In order to further illustrate the data modulation method provided by the embodiments of the present application, the following example is used for detailed description.

Example 1

Figure 3:
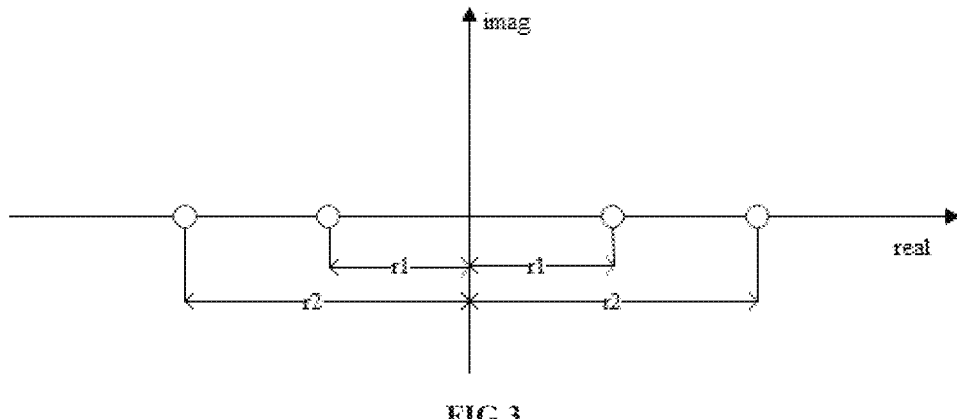
FIG. 3 is a schematic diagram of a group of constellation point modulation symbols $\{S(n)\}$ provided by an example of the present application.

FIG. 3 is a schematic diagram of a group of constellation point modulation symbols $\{S(n)\}$ provided by an example of the present application. As shown in FIG. 3, there are 4 constellation point modulation symbols, that is, N=4, in $\{S(n)\}$, n=0, 1, 2, . . . , N−1.

As shown in FIG. 3, among the 4 constellation point modulation symbols $\{S(n)\}$, there are 2 (N/2=2) constellation point modulation symbols with the same phase, both of which are 0, and the modulus values of the two constellation point modulation symbols are different, which are $r_1$ and $r_2$, respectively, and the minimum modulus value $r_1$ is greater than half of the modulus value difference, wherein half of the modulus value difference is $(r_2−r_1)/2$; the other 2 (N/2=2) constellation point modulation symbols also have the same phase, both of which are π, and the modulus values of the other two constellation point modulation symbols are also different, which are $r_1$ and $r_2$, respectively, and the minimum modulus value $r_1$ is greater than half of the modulus value difference. In this example, $r_1=r_2−r_1$.

Example 2

The difference between this example and Example 1 is that $r_1>r_2−r_1$ in this example, which can further reduce the peak average power ratio.

Example 3

Figure 4:
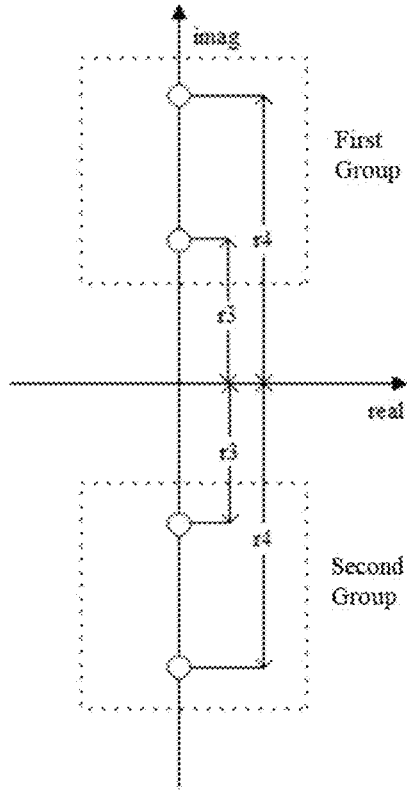
FIG. 4 is a schematic diagram of a group of constellation point modulation symbols $\{S(n)\}$ provided by another example of the present application.

FIG. 4 is a schematic diagram of a group of constellation point modulation symbols $\{S(n)\}$ provided by another example of the present application. As shown in FIG. 4, there are 4 constellation point modulation symbols, that is, N=4, in $\{S(n)\}$, n=0, 1, 2, . . . , N−1.

As shown in FIG. 4, the 4 constellation point modulation symbols $\{S(n)\}$ may be divided into 2 groups, wherein there are 2 (N/2=2) constellation point modulation symbols with the same phase in the first group of modulation symbols, the phases are π/2 respectively, and the modulus values of constellation point modulation symbols in the first group of modulation symbols are different, which are $r_3$ and $r_4$ respectively, there are 2 (N/2=2) constellation point modulation symbols with the same phase in the second group of modulation symbols, the phases are 3π/2 respectively, and the modulus values of constellation point modulation symbols in the second group of modulation symbols are different, which are $r_3$ and $r_4$ respectively. And the minimum modulus value $r_3$ is greater than half of the modulus value difference, wherein half of the modulus value difference is $(r_4−r_3)/2$.

Example 4

Figure 5:
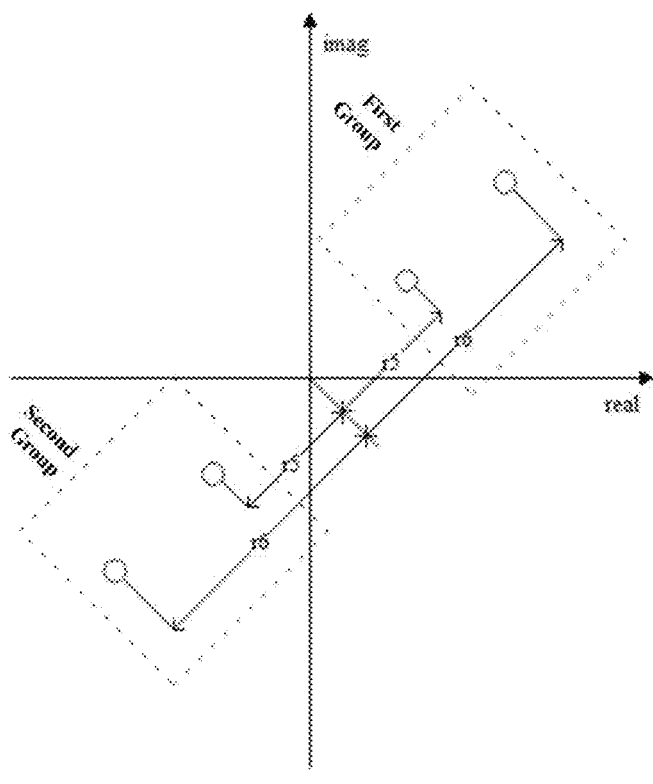
FIG. 5 is a schematic diagram of a group of constellation point modulation symbols $\{S(n)\}$ provided by another example of the present application.

FIG. 5 is a schematic diagram of a group of constellation point modulation symbols $\{S(n)\}$ provided by another example of the present application. As shown in FIG. 5, there are 4 constellation point modulation symbols, that is, N=4, in $\{S(n)\}$, n=0, 1, 2, . . . , N−1.

As shown in FIG. 5, the four constellation point modulation symbols $\{S(n)\}$ may be divided into 2 groups, wherein there are 2 (N/2=2) constellation point modulation symbols with the same phase in the first group of modulation symbols, the phases are π/4 respectively, and the modulus values of constellation point modulation symbols in the first group of modulation symbols are different, which are $r_5$ and $r_6$ respectively; there are 2 (N/2=2) constellation point modulation symbols with the same phase in the second group of modulation symbols, the phases are 5π/4 respectively, and the modulus values of constellation point modulation symbols in the second group of modulation symbols are different, which are $r_5$ and $r_6$ respectively. In this example, $r_5>r_6−r_5$, which can further reduce the peak average power ratio.

Example 5

Figure 6:
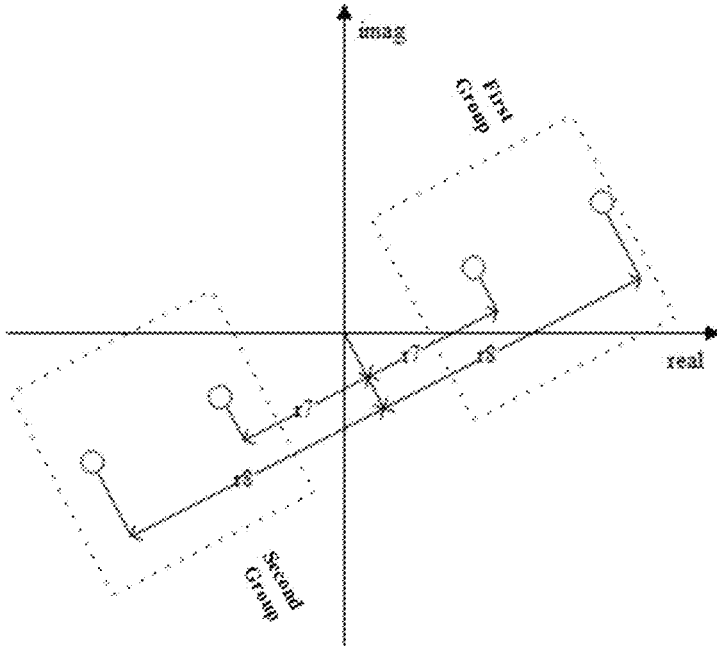
FIG. 6 is a schematic diagram of a group of constellation point modulation symbols $\{S(n)\}$ provided by another example of the present application.

FIG. 6 is a schematic diagram of a group of constellation point modulation symbols $\{S(n)\}$ provided by another example of the present application. As shown in FIG. 6, there are 4 constellation point modulation symbols, that is, N=4, in $\{S(n)\}$, n=0, 1, 2, . . . , N−1.

As shown in FIG. 6, the 4 constellation point modulation symbols $\{S(n)\}$ may be divided into 2 groups, wherein there are 2 (N/2=2) constellation point modulation symbols with the same phase in the first group of modulation symbols, the phases are φ respectively, and φ may be any angle. The modulus values of constellation point modulation symbols in the first group of modulation symbols are different, which are $r_7$ and $r_8$ respectively; there are 2 (N/2=2) constellation point modulation symbols with the same phase in the second group of modulation symbols, is the phases are π+φ respectively, and the modulus values of constellation point modulation symbols in the second group of modulation symbols are different, which are $r_7$ and $r_8$ respectively.

It can be understood that in the above Examples 1 to 5, the number of modulation symbols in the group of constellation point modulation symbols can be any even number greater than or equal to 4.

It can be understood that a group of constellation point modulation symbols {S(n)} in Examples 1 to 5 can be obtained by rotating any group of constellation point modulation symbols {$e^{j\varphi}$S(n)}, wherein φ may be equal to any angle. Any group of constellation point modulation symbols {S(n)} in Examples 1 to 5 may be divided into two groups of constellation point modulation symbols, that is, a first group of constellation point modulation symbols and a second group of constellation point modulation symbols. The N/2 constellation point modulation symbols in the first group of constellation point modulation symbols have the same phase, the N/2 constellation point modulation symbols in the second group of constellation point modulation symbols have the same phase, there is a phase difference of π between constellation point modulation symbols in the first group and those in the second group, and the number of constellation point modulation symbols in one group is equal to that of constellation point modulation symbols in the other group; the modulus values of the N/2 constellation point modulation symbols in the first group of constellation point modulation symbols are different from one another, and the modulus values of the N/2 constellation point modulation symbols in the second group of constellation point modulation symbols are different from one another. For any one of constellation point modulation symbols in the first group of constellation point modulation symbols, there is a constellation point modulation symbol with the same modulus value in the second group of constellation point modulation symbols.

Example 6

Figures 7, 8:
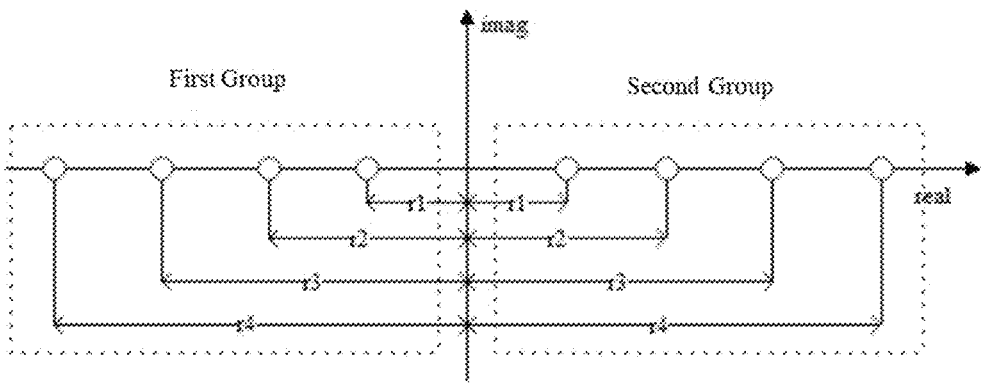
FIG. 7 is a schematic diagram of a group of constellation point modulation symbols $\{S(n)\}$ provided by another example of the present application.
FIG. 8 is a schematic diagram of constellation point mapping of data modulation provided by an example of the present application.

FIG. 7 is a schematic diagram of a group of constellation point modulation symbols {S(n)} provided by another example of the present application. As shown in FIG. 7, there are 8 constellation point modulation symbols, that is, N=8, in {S(n)}, n=0, 1, . . . , 7.

As shown in FIG. 7, the 8 constellation point modulation symbols {S(n)} may be divided into 2 groups, wherein there are 4 (N/2=4) constellation point modulation symbols with the same phase in a first group of modulation symbols, the phases are 0 respectively, and the modulus values of constellation point modulation symbols in the first group of modulation symbols are different, which are $r_1$, $r_2$, $r_3$ and $r_4$, respectively; there are 4 (N/2=4) constellation point modulation symbols with the same phase in a second group of modulation symbols, the phases are π respectively, and the modulus values of constellation point modulation symbols in the second group of modulation symbols are different, which are $r_1$, $r_2$, $r_3$ and $r_4$, respectively. There is a phase difference of π between constellation point modulation symbols in the first group of constellation point modulation symbols and those in the second group of constellation point modulation symbols. As shown in FIG. 7, the modulus value of one constellation point modulation symbol in the first group of modulation symbols is equal to the modulus value of one constellation point modulation symbol in the second group of modulation symbols, that is, the modulus value $r_1$ of the constellation point modulation symbol in the first group of modulation symbols is equal to the modulus value $r_1$ of the constellation point modulation symbol in the second group of modulation symbols, the modulus value $r_2$ of the constellation point modulation symbol in the first group of modulation symbols is equal to the modulus value $r_2$ of the constellation point modulation symbol in the second group of modulation symbols, the modulus value $r_3$ of the constellation point modulation symbol in the first group of modulation symbols is equal to the modulus value $r_3$ of the constellation point modulation symbol in the second group of modulation symbols, and the modulus value $r_4$ of the constellation point modulation symbol in the first group of modulation symbols is equal to the modulus value $r_4$ of the constellation point modulation symbol in the second group of modulation symbols. In the first group of modulation symbols or the second group of modulation symbols, the minimum modulus value $r_1$ of the constellation point modulation symbol is greater than half of the minimum modulus value difference of constellation point modulation symbols in this group. In order to further reduce the peak average power ratio, the minimum modulus value $r_1$ of the constellation point modulation symbol in the group can be made greater than the minimum modulus value difference of constellation point modulation symbol in the group.

Example 7

FIG. 8 is a schematic diagram of a constellation point mapping of data modulation provided by an example of the present application.

Assuming there is a group of binary bit data sequences [b(m)], the data sequence [b(m)] is modulated by using constellation modulation symbols {S(n)} provided in Example 3, as shown in FIG. 4. The data sequence is modulated by alternately using {S(n)} and {$e^{j\theta}$S(n)} with every $\log_2$ N binary bit data as a unit. Wherein θ=π/2, that is, {$e^{j\theta}$S(n)}={jS(n)}. As shown in FIG. 8, in this example, in odd bits of the modulated data symbol [x(k)], every 2 binary bit data correspond to one constellation point in the constellation point modulation symbols {S(n)}, specifically, 00 corresponds to $-jr_4$, 01 corresponds to $-jr_3$, 10 corresponds to $jr_4$, and 11 corresponds to $jr_3$; in even bits of the modulated data symbols [x(k)], every 2 binary bit data correspond to a constellation point in the constellation point modulation symbols {jS(n)}, specifically, 00 corresponds to $r_4$, 01 corresponds to $r_3$, 10 corresponds to $-r_4$, and 11 corresponds to $-r_3$.

Assuming that a group of binary bit data sequences b(m)=[b(0), b(1), b(2), b(3), b(4), b(5), b(6), b(7), b(8), b(9), b(10), b(11), b(12), b(13), b(14), b(15)]=[0, 0, 0, 0, 0, 1, 0, 1, 1, 0, 1, 0, 1, 1, 1, 1], m=0, 2, . . . , 15, the data sequence b(m) is modulated by alternately using {S(n)} and {jS(n)} with every 2 ($\log_2$ N, N=4) binary bit data sequence as a unit, so as to obtain modulated data symbols x(k)=[x(0), x(1), x(2), x(3), x(4), x(5), x(6), x(7)]=[$-jr_4$, $r_4$, $-jr_3$, $r_3$, $jr_4$, $-r_4$, $jr_3$, $-r_3$], k=0, 1, . . . , 7. The first group [b(0), b(1)]=[0, 0] of the data sequence b(m) is modulated by using the constellation point modulation symbols {S(n)}, so as to obtain the first modulated data symbol x(0)=[$-jr_4$]; the second group [b(2), b(3)]=[0, 0] of the data sequence b(m) is modulated by using the constellation point modulation symbols {jS(n)}, so as to obtain the second data modulation symbol x(1)=[$r_4$]; the third group [b(4), b(5)]=[0, 1] of the data sequence b(m) is modulated by using the constellation point modulation symbol {S(n)}, so as to obtain the third data modulation symbol x(2)=[$-jr_3$]; the fourth group [b(6), b(7)]=[0,1] of the data sequence b(m) is modulated by using the constellation point modulation symbols {jS(n)}, so as to obtain the fourth data modulation symbol x(3)=[$r_3$]; the fifth group [b(8), b(9)]=[0, 1] of the data sequence b(m) is modulated by using the constellation point modulation symbols {jS(n)}, so as to obtain the fifth data modulation symbol x(4)=[$jr_3$]; the sixth group [b(10), b(11)]=[1, 0] of the data sequence b(m) is modulated by using the constellation point modulation symbols {jS(n)}, so as to obtain the sixth data modulation symbol $x(5)=[-r_4]$; the seventh group [b(12), b(13)]=[1, 1] of the data sequence b(m) is modulated by using the constellation point modulation symbols {S(n)}, so as to obtain the seventh data modulation symbol $x(6)=[jr_3]$; and the eighth group [b(14), b(15)]=[1, 1] of the data sequence b(m) is modulated by using the constellation point modulation symbols {jS(n)}, so as to obtain the eighth data modulation symbol $x(7)=[-r_3]$.

It can be understood that the bit information "0, 1" of the constellation point modulation mapping manner in FIG. 8 is viewed from right to left, such as 00, 01, 11, 10 as viewed from bottom to top in FIG. 8, and the bit information "0, 1" of the data sequence b(m) in this Example is output from left to right.

Example 8

FIG. 9 is a schematic diagram of a constellation point mapping of data modulation provided by another example of the present application.

Assuming there is a group of binary bit data sequences [b(m)], the data sequence [b(m)] is modulated by using constellation modulation symbols {S(n)} provided in Example 3, as shown in FIG. 4; in {S(n)}, n=0, 1, . . . , N−1, and N=4. The data sequence is modulated by using {$e^{j\theta k}$S (n)} with every $\log_2$ N binary bit data as a unit, wherein {$e^{j\theta k}$S(n)} is obtained by rotating {S(n)}. Wherein k represents the position number of modulated data symbols, and k=0, 1, . . . , K−1, k=0 represents the first modulated data symbol, K represents the number of modulated data symbols, and $\theta=\pi/2$.

Assuming that a group of binary bit data sequences b(m)=[b(0), b(1), b(2), b(3), b(4), b(5), b(6), b(7), b(8), b(9), b(10), b(11), b(12), b(13), b(14), b(15)]=[0, 0, 0, 0, 0, 1, 0, 1, 1, 0, 1, 0, 1, 1, 1, 1], m=0, 1, . . . , 15, {$e^{j\theta k}$S(n)} is used to modulate the data sequence by taking every 2 ($\log_2$ N, N=4) binary bit data sequence as a unit, so as to obtain modulated data symbols x(k)=[x(0), x(1), x(2), x(3), x(4), x(5), x(6), x(7)]=[$-jr_4$, $r_4$, $-jr_3$, $r_3$, $jr_4$, $-r_4$, $jr_3$, $-r_3$]. The first group [b(0), b(1)]=[0,0] of the data sequence b(m) is modulated by using the constellation point modulation symbol {$e^{j\theta k}$S(n), k=0}={S(n)}, so as to obtain the first modulated data symbol $x(0)=[-jr_4]$; the second group [b(2), b(3)]=[0,0] of the data sequence b(m) is modulated by using the constellation point modulation symbol {$e^{j\theta k}$S(n), k=1}={jS(n)}, so as to obtain the second data modulation symbol $x(1)=[r_4]$; the third group [b(4), b(5)]=[0,1] of the data sequence b(m) is modulated by using the constellation point modulation symbol {$e^{j\theta k}$S(n), k=2}={−S(n)}, so as to obtain the third data modulation symbol $x(2)=[jr_3]$; the fourth group [b(6), b(7)]=[0,1] of the data sequence b(m) is modulated by using the constellation point modulation symbol {$e^{j\theta k}$S(n), k=3}={−jS(n)}, so as to obtain the fourth data modulation symbol $x(3)=[-r_3]$; the fifth group [b(8), b(9)]=[0,1] of the data sequence b(m) is modulated by using the constellation point modulation symbol {$e^{j\theta k}$S(n), k=4}={S(n)}, so as to obtain the fifth data modulation symbol $x(4)=[jr_4]$; the sixth group [b(10), b(11)]=[1, 0] of the data sequence b(m) is modulated by using the constellation point modulation symbol {$e^{j\theta k}$S(n), k=5}={jS(n)}, so as to obtain the sixth data modulation symbol $x(5)=[-r_4]$; the seventh group [b(12), b(13)]=[1, 1] of the data sequence b(m) is modulated by using the constellation point modulation symbol {$e^{j\theta k}$S(n), k=6}={−S(n)}, so as to obtain the seventh data modulation symbol $x(6)=[-jr_3]$; and the eighth group [b(14), b(15)]=[1, 1] of the data sequence b(m) is modulated by using the constellation point modulation symbol {$e^{j\theta k}$S(n), k=7}={−jS(n)}, so as to obtain the eighth data modulation symbol $x(8)=[r_3]$.

It can be understood that when $\theta=\pi/2$ and k=0, 1, 2, 3, 4, 5, 6, 7, . . . , $e^{j\theta k}=e^{j*k*\pi/2}$=[1, j, −1, −j, 1, j, −1, −j, . . . ], that is, every four bits of k is a cycle, and for constellation point modulation, mapping modulation is performed on a cycle consisting of every four bits in the order of {S(n)}, {jS(n)}, {−S(n)}, {−jS(n)}. For example, a modulation unit of the data sequence is 00 bit, then the result of mapping modulation may be one of $-jr_4$, $j*-jr_4=r_4$, $-(-jr_4)=jr_4$, or $-j*(-jr_4)=-r_4$.

It can be understood that the bit information "0, 1" of the constellation point modulation mapping method in FIG. 9 is viewed from right to left, such as 00, 01, 11, 10 as viewed from bottom to top in FIG. 9, and the bit information "0, 1" of the data sequence b(m) in the example is output from left to right.

By means of the above modulation manner, the phase difference between adjacent modulation symbols can be reduced, and the peak average power ratio of modulated data signals can be reduced.

Example 9

Assuming that a group of binary bit data sequences [b(m)] is modulated by a group of constellation point modulation symbols {S(n)} to form modulated data symbols [x(k)] includes: the data sequence is modulated by alternately using {S(n)} and {$e^{j\theta}$S(n)} with every $\log_2$ N binary bit data as a unit, wherein $\theta=\pi/2$, that is, {$e^{j\theta}$S(n)}={jS(n)}. A filtering operation is performed on the modulated data symbols by using a time-domain convolution method, and the filtering parameter of the filtering operation is E [1,1], wherein $$E = \frac{\sqrt{2}}{2}.$$

Specifically, the modulated data symbol [x(k)] is added to the next adjacent modulated data symbol [x(k+1)] and then the sum thereof is multiplied by $$\frac{\sqrt{2}}{2},$$

so as to form a time-domain data sequence [d(k)]. The time-domain data sequence [d(k)] is carried on a physical time-frequency resource for transmission.

In this example, assuming there are two groups of consecutive binary bit data sequences, the first group of binary bit data sequences is [b(m)$_1$]=[b(0)$_1$, b(1)$_1$, b(2)$_1$, b(3)$_1$, b(4)$_1$, b(5)$_1$, b(6)$_1$, b(7)$_1$, b(8)$_1$, b(9)$_1$, b(10)$_1$, b(11)$_1$, b(12)$_1$, b(13)$_1$, b(14)$_1$, b(15)$_1$]=[0, 0, 0, 0, 0, 1, 0, 1, 1, 0, 1, 0, 1, 1, 1, 1], and the second group of binary bit data sequences is [b(m)$_2$]=[b(0)$_2$, b(1)$_2$, b(2)$_2$, b(3)$_2$, b(4)$_2$, b(5)$_2$, b(6)$_2$, b(7)$_2$, b(8)$_2$, b(9)$_2$, b(10)$_2$, b(11)$_2$, b(12)$_2$, b(13)$_2$, b(14)$_2$, b(15)$_2$], m=0, 1, . . . , 15, wherein the first two bit sequences of the first group of binary bit data sequences are the same with the first two bit sequences of the second group of binary bit data sequences, and the last four bit sequences of the first group of binary bit data sequences are the same with the last four bit sequences of the second group of binary bit data sequences, therefore, [b(m)$_2$]=[b(0)$_1$, b(1)$_1$, b(2)$_2$, b(3)$_2$, $b(4)_2$, $b(5)_2$, $b(6)_2$, $b(7)_2$, $b(8)_2$, $b(9)_2$, $b(10)_2$, $b(11)_2$, $b(12)_1$, $b(13)_1$, $b(14)_1$, $b(15)_1$]. The data sequence [$b(m)_1$] is modulated by using the constellation point modulation symbols {$S(n)$} in Example 2.

The data sequence [$b(m)_1$] is modulated by alternately using {$S(n)$} and {$jS(n)$} with every 2 ($\log_2$ N, N=4) binary bit data as a unit, so as to obtain the modulated data symbols [$x(k)1]_1$]=[$x(0)_1$, $x(1)_1$, $x(2)_1$, $x(3)_1$, $x(4)_1$, $x(5)_1$, $x(6)_1$, $x(7)_1$]=[$-jr4$, $r4$, $-jr3$, $r3$, $jr4$, $-r4$, $jr3$, $-r_3$]. Similarly, the data sequence [$b(m)_2$] is modulated so as to obtain the modulated data symbol [$x(k)_2$]=[$x(0)_1$, $x(1)_2$, $x(2)_2$, $x(3)_2$, $x(4)_2$, $x(5)_2$, $x(6)_1$, $x(7)_1$]=[$-jr_4$, $x(1)_2$, $x(2)_2$, $x(3)_2$, $x(4)_2$, $x(5)_2$, $jr_3$, $-r_3$], wherein k=0, 1, . . . , 7.

Then, a filtering operation is performed on the first group of modulated data symbols, specifically, the first modulated data symbol $x(0)^1$ is added to the second modulated data symbol $x(1)_1$ and then the sum thereof multiplied by $$\frac{\sqrt{2}}{2},$$

so as to form the first time-domain data sequence $$d(0)_1 = \frac{\sqrt{2}}{2}(r_4 - jr_4),$$

the second modulated data symbol $x(1)_1$ is added to the third modulated data symbol $x(2)_1$ and then the sum thereof is multiplied by $$\frac{\sqrt{2}}{2},$$

so as to form the second time-domain data sequence $$d(1)_1 = \frac{\sqrt{2}}{2}(r_4 - jr_3)$$

the third modulated data symbol $x(2)_1$ is added to the fourth modulated data symbol $x(3)_1$ and then multiplied by $$\frac{\sqrt{2}}{2},$$

so as to form the third time-domain data sequence $$d(2)_1 = \frac{\sqrt{2}}{2}(r_3 - jr_3),$$

the fourth modulated data symbol $x(3)_1$ is added to the fifth modulated data symbol $x(4)_1$ and then the sum thereof is multiplied by $$\frac{\sqrt{2}}{2},$$

so as to form the fourth time-domain data sequence $$d(3)_1 = \frac{\sqrt{2}}{2}(r_3 + jr_4),$$

the fifth modulated data symbol $x(4)_1$ is added to the sixth modulated data symbol $x(5)_1$ and then the sum thereof is multiplied by $$\frac{\sqrt{2}}{2},$$

so as to form the fifth time-domain data sequence $$d(4)_1 = \frac{\sqrt{2}}{2}(-r_4 + jr_4),$$

the sixth modulated data symbol $x(5)_1$ is added to the seventh modulated data symbol $x(6)_1$ and then the sum thereof is multiplied by $$\frac{\sqrt{2}}{2},$$

so as to form the sixth time-domain data sequence $$d(5)_1 = \frac{\sqrt{2}}{2}(-r_4 + jr_3),$$

the seventh modulated data symbol $x(6)_1$ is added to the eighth modulated data symbol $x(7)_1$ and then the sum thereof is multiplied by $$\frac{\sqrt{2}}{2},$$

so as to form the seventh time-domain data sequence $$d(6)_1 = \frac{\sqrt{2}}{2}(-r_3 + jr_3),$$

and the eighth modulated data symbol $x(7)_1$ is added to the first modulated data symbol of the second group $x(0)_2$($x(0)_2$=$x(0)_1$) and then the sum thereof is multiplied by $$\frac{\sqrt{2}}{2},$$

so as to form the eighth time-domain data sequence $$d(7)_1 = \frac{\sqrt{2}}{2}(-r_3 - jr_4).$$ That is, [$d(k)$] =

$$[d(0), d(1), d(2), d(3), d(4), d(5), d(6), d(7)] =$$

17

-continued $$\frac{\sqrt{2}}{2}[x(0) + x(1), x(1) + x(2), x(2) + x(3), x(3) + x(4), x(4) +$$

$$x(5), x(5) + x(6), x(6) + x(7), x(7) + x(0)] = \frac{\sqrt{2}}{2}[r_4 - jr_4, r_4 -$$

$$jr_3, r_3 - jr_3, r_3 + jr_4, -r_4 + jr_4, -r_4 + jr_3, -r_3 + jr_3, -r_3 - jr_4].$$

The time-domain data sequence is obtained by the above modulation manner, which can further reduce the peak average power ratio of the modulated data signal.

Example 10

Assuming that a group of binary bit data sequences [b(m)] is modulated by a group of constellation point modulation symbols {S(n)} so as to form modulated data symbols [x(k)] includes: the data sequence is modulated by alternately using {S(n)} and {$e^{j\theta}$S(n)} with every 2 ($\log_2$ N, N=4) binary bit data as a unit, wherein $\theta=\pi/2$, that is, {$e^{j\theta}$S(n)}={jS(n)}. Performing a filtering operation on the modulated data symbols includes: performing a filtering operation on the modulated data symbols by using a time-domain convolution method based on the filtering parameter. Specifically, the modulated data symbol [x(k)] is added to the previous adjacent modulated data symbol [x(k−1)] and then the sum thereof is multiplied by $$\frac{\sqrt{2}}{2},$$

so as to form a time-domain data sequence [d(k)], it should be noted that when the modulated data symbol [x(k)] is the first bit, it is added to the last modulated data symbol x(K−1) and then the sum thereof multiplied by $$\frac{\sqrt{2}}{2},$$

so as to form a circular convolution. Alternatively, the modulated data symbol [x(k)] is added to the next adjacent modulated data symbol [x(k+1)] and then the sum thereof is multiplied by $$\frac{\sqrt{2}}{2},$$

so as to form a time-domain data sequence [d(k)], it should be noted that when the modulated data symbol [x(k)] is the last bit, it is added to the first modulated data symbol x(0) and then multiplied by $$\frac{\sqrt{2}}{2},$$

so as to form a circular convolution. The time-domain data sequence [d(k)] is carried on a physical time-frequency resource for transmission.

In this example, assuming that a group of binary bit data sequences b(m)=[b(0), b(1), b(2), b(3), b(4), b(5), b(6), b(7), b(8), b(9), b(10), b(11), b(12), b(13), b(14), b(15)]=[0, 0, 0, 0, 0, 1, 0, 1, 1, 0, 1, 0, 1, 1, 1, 1], m=0, 1, . . . , 15, the data sequence [b(m)] is modulated by using the constellation point modulation symbols {S(n)} in Example 2.

The data sequence [b(m)1] is modulated by alternately using {S(n)} and {jS(n)} with every 2 ($\log_2$ N, N=4) binary bit data as a unit, so as to obtain modulated data symbols [x(k)]=[x(0), x(1), x(2), x(3), x(4), x(5), x(6), x(7)]=[−jr_4, r_4, −jr_3, r_3, jr_4, −r_4, jr_3, −r_3], wherein k=0, 1, . . . , 7.

Then the first modulated data symbol x(0) is added to the eighth modulated data symbol x(8) and then the sum thereof is multiplied by $$\frac{\sqrt{2}}{2},$$

so as to form the first time-domain data sequence $$d(0) = \frac{\sqrt{2}}{2}(-r_3 - jr_4),$$

the second modulated data symbol x(1) is added to the first modulated data symbol x(0) and then the sum thereof is multiplied by $$\frac{\sqrt{2}}{2},$$

so as to form the second time-domain data sequence $$d(1) = \frac{\sqrt{2}}{2}(r_4 - jr_4),$$

the third modulated data symbol x(2) is added to the second modulated data symbol x(1) and then the sum thereof is multiplied by $$\frac{\sqrt{2}}{2},$$

so as to form the third time-domain data sequence $$d(2) = \frac{\sqrt{2}}{2}(r_4 - jr_3),$$

the fourth modulated data symbol x(3) is added to the third modulated data symbol x(2) and then the sum thereof is multiplied by $$\frac{\sqrt{2}}{2},$$

so as to form the fourth time-domain data sequence $$d(3) = \frac{\sqrt{2}}{2}(r_3 - jr_3),$$

the fifth modulated data symbol x(4) is added to the fourth modulated data symbol x(3) and then the sum thereof is multiplied by $$\frac{\sqrt{2}}{2},$$

so as to form the fifth time-domain data sequence $$d(4) = \frac{\sqrt{2}}{2}(r_3 + jr_4),$$

the sixth modulated data symbol x(5) is added to the fifth modulated data symbol x(4) and then the sum thereof is multiplied by $$\frac{\sqrt{2}}{2},$$

so as to form the sixth time-domain data sequence $$d(5) = \frac{\sqrt{2}}{2}(-r_4 + jr_4),$$

the seventh modulated data symbol x(6) is added to the sixth modulated data symbol x(5) and then the sum thereof is multiplied by $$\frac{\sqrt{2}}{2},$$

so as to form the seventh time-domain data sequence $$d(6) = \frac{\sqrt{2}}{2}(-r_4 + jr_3),$$

and the eighth modulated data symbol x(7) is added to the seventh modulated data symbol x(6) and then the sum thereof is multiplied by $$\frac{\sqrt{2}}{2},$$

so as to form the eighth time-domain data sequence $$d(7) = \frac{\sqrt{2}}{2}(-r_3 + jr_3).$$

Alternatively, the first modulated data symbol x(0) is added to the second modulated data symbol x(1) and then the sum thereof is multiplied by $$\frac{\sqrt{2}}{2},$$

so as to form the first time-domain data sequence $$d(0) = \frac{\sqrt{2}}{2}(-jr_4 + r_4),$$

the second modulated data symbol x(1) is added to the third modulated data symbol x(2) and then the sum thereof is multiplied by $$\frac{\sqrt{2}}{2},$$

so as to form the second time-domain data sequence $$d(1) = \frac{\sqrt{2}}{2}(r_4 - jr_3),$$

the third modulated data symbol x(2) is added to the fourth modulated data symbol x(3) and then the sum thereof is multiplied by $$\frac{\sqrt{2}}{2},$$

so as to form the third time-domain data sequence $$d(2) = \frac{\sqrt{2}}{2}(-jr_3 + r_3),$$

the fourth modulated data symbol x(3) is added to the fifth modulated data symbol x(4) and then the sum thereof is multiplied by $$\frac{\sqrt{2}}{2},$$

so as to form the fourth time-domain data sequence $$d(3) = \frac{\sqrt{2}}{2}(r_3 + jr_4),$$

the fifth modulated data symbol x(4) is added to the sixth modulated data symbol x(5) and then the sum thereof is multiplied by $$\frac{\sqrt{2}}{2},$$

so as to form the fifth time-domain data sequence $$d(4) = \frac{\sqrt{2}}{2}(jr_4 - r_4),$$

the sixth modulated data symbol x(5) is added to the seventh modulated data symbol x(6) and then the sum thereof is multiplied by $$\frac{\sqrt{2}}{2},$$

so as to form the sixth time-domain data sequence $$d(5) = \frac{\sqrt{2}}{2}(-r_4 + jr_3),$$

the seventh modulated data symbol x(6) is added to the eighth modulated data symbol x(7) and then the sum thereof is multiplied by $$\frac{\sqrt{2}}{2},$$

so as to form the seventh time-domain data sequence $$d(6) = \frac{\sqrt{2}}{2}(jr_3 - r_3),$$

and the eighth modulated data symbol x(7) is added to the first modulated data symbol x(0) and then the sum thereof is multiplied by $$\frac{\sqrt{2}}{2},$$

so as to form the eighth time-domain data sequence $$d(7) = \frac{\sqrt{2}}{2}(-r_3 - jr_4).$$

The time-domain data sequence is obtained by the above modulation manner, which can further reduce the peak average power ratio of the modulated data signal.

It can be understood that the constellation point modulation symbols {S(n)} of Example 3 are used in Examples 7, 8, 9, and 10 only to make these examples easier to understand and calculate. In an actual modulation process, any constellation point modulation symbol {S(n)} including, but not limited to, those in the above Examples 1 to 5, as well as any other constellation point modulation symbol {S(n)} provided according to the data modulation method of the present application may be used.

Example 11

Assuming a group of binary bit data sequences [b(m)] is modulated by a group of constellation point modulation symbols {S(n)} so as to form modulated data symbols [x(k)], then discrete Fourier transform is performed on the modulated data symbols [x(k)] so as to generate frequency-domain data, and then the frequency-domain data is dot-multiplied by the frequency-domain filter function. Wherein the frequency-domain filter function is transformed by discrete Fourier transform via the time-domain filter parameter E [1,1] to $$E = \frac{\sqrt{2}}{2}.$$

Figure 10:
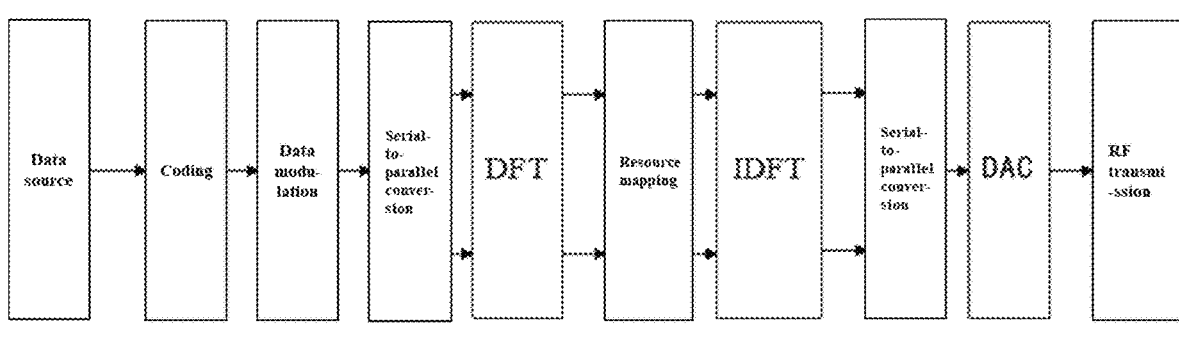
FIG. 10 is a schematic structural diagram of a transmitter module provided by an example of the present application.

FIG. 10 is a schematic structural diagram of a transmitter module provided by an example of the present application. As shown in FIG. 10, a group of binary bit data sequences passes through a coding module and a data modulation module, wherein the data modulation module generates modulated data symbols by using the data modulation method provided in any of the above embodiments, and the modulated data symbols are subjected to serial-to-parallel conversion and then to discrete Fourier transform (DFT), resource mapping, inverse discrete Fourier transform (IDFT), digital to analog conversion (DAC) and other processing, and finally the data is transmitted on an radio frequency link.

Figure 11:
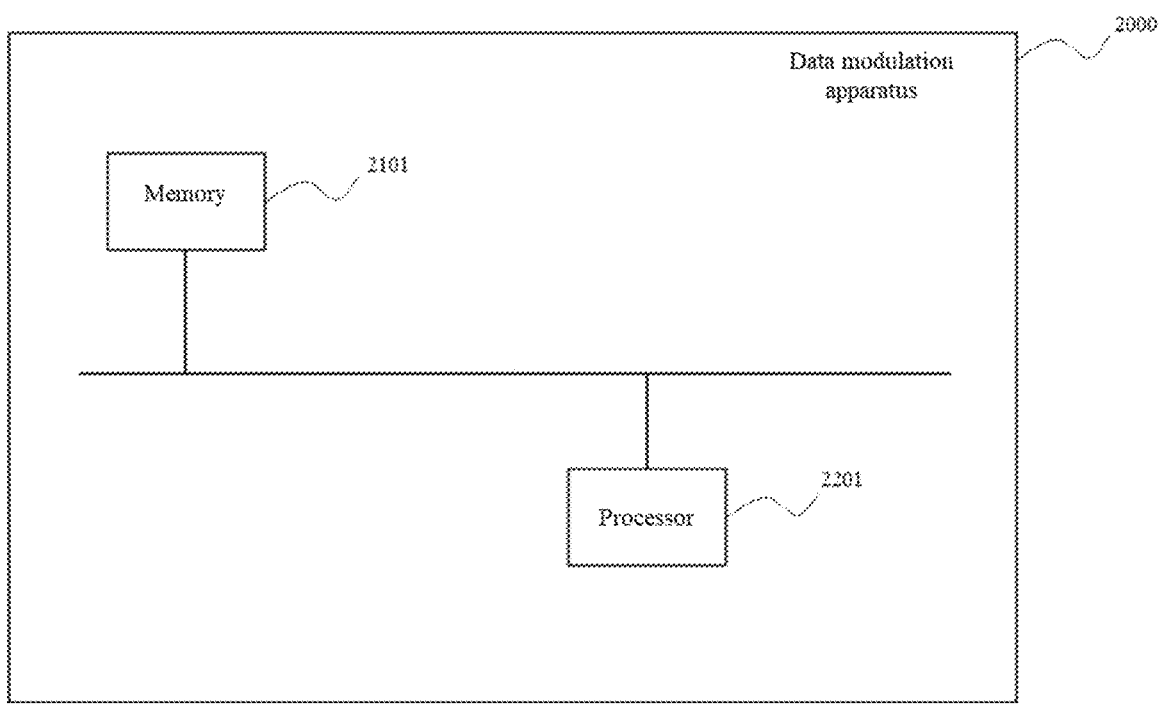
FIG. 11 is a schematic structural diagram of a data modulation apparatus provided by an embodiment of the present application.

FIG. 11 is a schematic structural diagram of a data modulation apparatus provided by an embodiment of the present application. As shown in FIG. 11, the data modulation apparatus 2000 includes a memory 2100 and a processor 2200. The number of the memory 2100 and the processor 2200 may be one or more than one, in FIG. 11, one memory 2101 and one processor 2201 are taken as an example; and the memory 2101 and the processor 2201 in a network device may be connected by a bus or other ways, and in FIG. 11, connection via a bus is taken as an example.

The memory 2101 is a computer-readable storage medium that can be used to store software programs, computer-executable programs, and modules, such as program instructions/modules corresponding to the method provided in any embodiment of the present application. The processor 2201 implements the data modulation method provided in any of the above embodiments by running the software programs, instructions, and modules stored in the memory 2101.

The memory 2101 may mainly include a program storage area and a data storage area, wherein the program storage area can store an operating system and an application required for at least one function. In addition, the memory 2101 may include a high-speed random access memory, and may also include a non-volatile memory, such as at least one disk storage device, a flash memory device or other non-volatile solid-state storage device. In some instances, the memory 2101 further includes a memory remotely disposed relative to the processor 2201, and these remote memories may be connected to the device via network. Examples of the above-mentioned network include, but are not limited to, the Internet, an intranet, a local area network, a mobile communication network, and combinations thereof.

An embodiment of the present application further provides a non-transitory computer-readable storage medium storing computer-executable instructions, wherein the computer-executable instructions are used to execute the data modulation method provided in any embodiment of the present application.

An embodiment of the present application further provides a computer program product, including a computer program or computer instruction, the computer program or computer instruction is stored in a computer-readable storage medium, a processor of a computer device reads the computer program or the computer instruction from the computer-readable storage medium, and the processor executes the computer program or the computer instruction, so that the computer device performs the data modulation method provided in any embodiment of the present application.

The system architecture and application scenarios described in the embodiments of the present application are intended to more clearly illustrate the technical solutions of the embodiments of the present application, and do not constitute a limitation on the technical solutions provided in the embodiments of the present application. Those skilled in the art will appreciate that with the evolution of the system architecture and the emergence of new application scenarios, the technical solutions provided in the embodiments of the present application are equally applicable to similar technical problems.

It is to be understood by those skilled in the art that all or some of the steps, systems, and functional modules/units in a system and device in the method disclosed above may be implemented as software, firmware, hardware, and suitable combination thereof.

In hardware implementations, division among functional modules/units mentioned in the above description does not necessarily corresponds to the division among physical components; for example, a physical component may have a plurality of functions, or a function or step may be performed by several physical components in cooperation. Some or all of the physical components may be implemented as software to be executed by a processor, such as a central processor, digital signal processor, or microprocessor, or as hardware, or as an integrated circuit, such as an application specific integrated circuit. Such software can be distributed on computer-readable media, which may include computer storage media (or non-transitory media) and communication media (or transitory media). As is well known to those skilled in the art, the term "computer storage media" includes volatile and nonvolatile, removable and non-removable media implemented in any method or technology for storage of information (such as computer-readable instructions, data structures, program modules, or other data). Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and is accessible by a computer. In addition, as is well known to those skilled in the art, communication media typically includes computer-readable instructions, data structures, program modules, or other data in a modulated data signal such as a carrier wave or other transport mechanism, and can include any information delivery media.

The terms "component", "module", "system" and the like used in this specification are used to denote a computer-related entity, hardware, firmware, a combination of hardware and software, software, or software in execution. For example, a component may be, but is not limited to, a process running on a processor, a processor, an object, an executable file, an execution thread, a program, or a computer. By way of illustration, both applications running on a computing device and a computing device may be components. One or more components can reside in a process or an execution thread, and a component can be located on a computer or distributed between two or more computers. In addition, these components can be executed from various computer-readable media having various data structures stored thereon. Components can, for example, communicate through a local or remote process based on a signal having one or more data packets (e.g., data from two components interacting with another component between a local system, a distributed system, or a network, such as the Internet interacting with other systems through signals).

Some embodiments of the present application are described above with reference to the accompanying drawings, which is not intended to limit the scope of the present application. Any modification, equivalent replacement, improvement, etc., that is made within the scope and principle of the present application by those skilled in the art should be comprised within the scope of the claims of the present application.

What is claimed is:

1. A data modulation method, comprising:
modulating a data sequence by using N constellation point modulation symbols {S(n)}, to obtain K modulated data symbols [x(k)], wherein the N constellation point modulation symbols comprise two groups of modulation symbols, the phase difference between the two groups of modulation symbols is a preset angle, and N is an even number greater than or equal to 4, n is any integer from 0 to N−1, K represents a number of the modulated data symbols, K is an integer, and k is any integer from 0 to K−1;
performing a filtering operation on the modulated data symbols, to obtain filtered data, wherein a filtering parameter of the filtering operation comprises E [1,1], wherein $E=\sqrt{2}/2$; and
transmitting the filtered data on a physical resource.

2. The method according to claim 1, wherein the two groups of modulation symbols comprise a first group of modulation symbols and a second group of modulation symbols, the modulation symbols in the first group of modulation symbols have the same phase, the modulation symbols in the second group of modulation symbols have the same phase, and a phase difference between the first group of modulation symbols and the second group of modulation symbols is 180 degrees.

3. The method according to claim 1, wherein a number of modulation symbols comprised in each of the two groups of modulation symbols is N/2.

4. The method according to claim 1, wherein modulating the data sequence by using N constellation point modulation symbols {S(n)} comprises:
modulating the data sequence by alternately using constellation point modulation symbols {S(n)} and constellation point modulation symbols {$e^{j\theta}$S(n)} after phase change θ, wherein e is a natural constant, j is an imaginary unit, and θ is equal to π/2 or −π/2.

5. The method according to claim 4, wherein the constellation point modulation symbols {S(n)} and the constellation point modulation symbols $\{e^{j\theta}S(n)\}$ after phase change $\theta$ are different sets of constellation point modulation symbols.

6. The method according to claim 4, wherein modulating the data sequence by alternately using the constellation point modulation symbols $\{S(n)\}$ and the constellation point modulation symbols $\{e^{j\theta}S(n)\}$ after phase change $\theta$ comprises:

modulating the data sequence by alternately using the constellation point modulation symbols $\{S(n)\}$ and the constellation point modulation symbols $\{e^{j\theta}S(n)\}$ after phase change $\theta$ with M binary bit data as a unit, wherein $M = \log_2 N$, M is a logarithm of N with base 2.

7. The method according to claim 4, wherein modulating the data sequence by alternately using the constellation point modulation symbols $\{S(n)\}$ and the constellation point modulation symbols $\{e^{j\theta}S(n)\}$ after phase change $\theta$ comprises:

modulating the data sequence by using constellation point modulation symbols $\{e^{j\theta k}S(n)\}$ carrying position numbers of data symbols, wherein k represents the position number of the data symbol.

8. The method according to claim 6, wherein at least one binary bit data of the M binary bit data is modulated by different phases of the constellation point modulation symbol $\{S(n)\}$.

9. The method according to claim 2, wherein a minimum modulus value of each group of modulation symbols is greater than half of a minimum modulus value difference, wherein the modulus value difference represents a modulus value difference between any two modulation symbols in each group of modulation symbols.

10. The method according to claim 2, wherein a minimum modulus value of each group of modulation symbols is greater than a minimum modulus value difference, wherein the modulus value difference represents a modulus value difference between any two modulation symbols in each group of modulation symbols.

11. The method according to claim 2, wherein modulus values of the modulation symbols in each group are different from one another, and a modulus value of any modulation symbol in the first group of modulation symbols is the same with a modulus value of one modulation symbol in the second group of modulation symbols.

12. The method according to claim 1, wherein performing the filtering operation on the modulated data symbols comprises:

performing the filtering operation on the modulated data symbols by using a time-domain convolution method based on the filtering parameter.

13. The method according to claim 12, wherein the time-domain convolution method is circular convolution.

14. The method according to claim 1, wherein performing the filtering operation on the modulated data symbols comprises:

transforming the modulated data symbols into frequency-domain data;

transforming the filtering parameter into a frequency-domain filtering parameter; and performing the filtering operation on the frequency-domain data by using a frequency-domain dot-multiplication method based on the frequency-domain filtering parameter.

15. A data modulation apparatus, comprising:

at least one processor; and at least one memory for storing at least one program;

wherein the at least one program, when executed by the at least one processor, implements the data modulation method according to claim 1.

16. A non-transitory computer-readable storage medium, storing a processor-executable computer program thereon, wherein the processor-executable computer program, when executed by a processor, implements the data modulation method according to claim 1.

17. The method according to claim 13, wherein performing the filtering operation on the modulated data symbols by using circular convolution comprises:

adding two adjacent modulated data symbols, and then multiplying a sum thereof by a preset parameter, to obtain a time-domain data sequence.

18. The method according to claim 17, wherein performing the filtering operation on the modulated data symbols by using circular convolution comprises:

upon the condition that k is less than K−1, adding x(k) to x(k+1), and then multiplying a sum thereof by a preset parameter, to obtain a time-domain data sequence.

\* \* \* \* \*